United States Patent
Hurd et al.

(10) Patent No.: US 9,250,910 B2
(45) Date of Patent: Feb. 2, 2016

(54) CURRENT CHANGE MITIGATION POLICY FOR LIMITING VOLTAGE DROOP IN GRAPHICS LOGIC

(71) Applicant: Intel Corporation, Santa Clara, CA (US)

(72) Inventors: Linda L. Hurd, Cool, CA (US); Wenyin Fu, Folsom, CA (US); Josh B. Mastronarde, Sacramento, CA (US); Pradeep K. Golconda, Eldorado Hills, CA (US); Shalini Sankar, Folsom, CA (US); Eric C. Samson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 145 days.

(21) Appl. No.: 14/040,472

(22) Filed: Sep. 27, 2013

(65) Prior Publication Data

US 2015/0091915 A1    Apr. 2, 2015

(51) Int. Cl.
*G06F 1/32* (2006.01)
*G06F 9/38* (2006.01)

(52) U.S. Cl.
CPC ............... *G06F 9/38* (2013.01); *G06F 1/3203* (2013.01); *G06F 1/324* (2013.01); *G06F 1/325* (2013.01); *G06F 1/3206* (2013.01)

(58) Field of Classification Search
None
See application file for complete search history.

(56) References Cited

U.S. PATENT DOCUMENTS

| | | |
|---|---|---|
| 5,953,020 A | 9/1999 | Wang et al. |
| 6,636,976 B1 * | 10/2003 | Grochowski et al. ......... 713/320 |
| 7,337,339 B1 | 2/2008 | Choquette et al. |
| 7,386,737 B2 | 6/2008 | Finkelstein et al. |
| 7,574,613 B2 | 8/2009 | Holle et al. |
| 7,634,668 B2 | 12/2009 | White et al. |
| 7,664,971 B2 | 2/2010 | Oh |
| 7,882,369 B1 | 2/2011 | Kelleher et al. |
| 7,886,164 B1 | 2/2011 | Alben et al. |
| 8,099,618 B2 | 1/2012 | Vorbach et al. |

(Continued)

FOREIGN PATENT DOCUMENTS

| | | |
|---|---|---|
| WO | WO 2012129147 A2 * | 9/2012 |
| WO | 2013/101189 A1 | 7/2013 |
| WO | 2013/101829 A1 | 7/2013 |

OTHER PUBLICATIONS

Non-Final Office Action received for U.S. Appl. No. 13/077,618, mailed on Dec. 26, 2012, 7 pages.

(Continued)

*Primary Examiner* — Kee M Tung
*Assistant Examiner* — Ryan M Gray
(74) *Attorney, Agent, or Firm* — Alpine Technology Law Group LLC (57) ABSTRACT

Methods and apparatus relating to a current change mitigation policy for limiting voltage droop in graphics logic are described. In an embodiment, logic inserts one or more bubbles in one or more Execution Unit (EU) logic pipelines or one or more sampler logic pipelines of a processor. The bubbles at least temporarily reduce execution of operations in one or more subsystems of the processor based at least partially on a comparison of a first value and one or more clamping threshold values. The first value is determined based at least partially on a summation of products of one or more event counts and dynamic capacitance weights for one or more subsystems of the processor. Other embodiments are also disclosed and claimed.

26 Claims, 9 Drawing Sheets

(56) References Cited

U.S. PATENT DOCUMENTS

| | | | |
|---|---|---|---|
| 8,193,831 | B1 | 6/2012 | Kadosh et al. |
| 8,214,663 | B2 | 7/2012 | Floyd et al. |
| 8,250,394 | B2 | 8/2012 | Agrawal |
| 8,335,941 | B2 | 12/2012 | Chang et al. |
| 8,539,269 | B2 | 9/2013 | Rotem et al. |
| 2001/0011356 | A1 | 8/2001 | Lee et al. |
| 2001/0029556 | A1 | 10/2001 | Priem et al. |
| 2002/0019949 | A1 | 2/2002 | Meynard |
| 2002/0169990 | A1 | 11/2002 | Sherburne, Jr. |
| 2003/0007394 | A1 | 1/2003 | Phi et al. |
| 2003/0115428 | A1 | 6/2003 | Zaccarin et al. |
| 2004/0120445 | A1* | 6/2004 | Burns et al. .................... 377/27 |
| 2004/0215988 | A1* | 10/2004 | Clabes et al. ................ 713/300 |
| 2005/0154931 | A1 | 7/2005 | Oh |
| 2005/0289377 | A1 | 12/2005 | Luong et al. |
| 2006/0047987 | A1 | 3/2006 | Prabhakaran et al. |
| 2006/0053326 | A1 | 3/2006 | Naveh et al. |
| 2006/0069936 | A1 | 3/2006 | Lint et al. |
| 2006/0161799 | A1 | 7/2006 | Degenhardt |
| 2006/0259804 | A1 | 11/2006 | Fry |
| 2007/0206683 | A1 | 9/2007 | Lin |
| 2007/0208964 | A1 | 9/2007 | Sandon et al. |
| 2007/0234075 | A1 | 10/2007 | Zimmer et al. |
| 2007/0245165 | A1 | 10/2007 | Fung |
| 2008/0001795 | A1 | 1/2008 | Arabi et al. |
| 2008/0005592 | A1 | 1/2008 | Allarey et al. |
| 2008/0235364 | A1 | 9/2008 | Gorbatov et al. |
| 2008/0307248 | A1 | 12/2008 | Amano et al. |
| 2009/0001814 | A1 | 1/2009 | Subramaniam |
| 2009/0204830 | A1 | 8/2009 | Frid et al. |
| 2009/0271141 | A1 | 10/2009 | Coskun et al. |
| 2009/0300329 | A1* | 12/2009 | Naffziger et al. ............. 712/205 |
| 2010/0082943 | A1 | 4/2010 | Yamamoto |
| 2010/0115304 | A1 | 5/2010 | Finkelstein et al. |
| 2010/0169692 | A1 | 7/2010 | Burton |
| 2010/0218029 | A1 | 8/2010 | Floyd et al. |
| 2010/0274938 | A1 | 10/2010 | Anand et al. |
| 2011/0022871 | A1 | 1/2011 | Bouvier et al. |
| 2011/0093724 | A1 | 4/2011 | Park et al. |
| 2011/0099397 | A1 | 4/2011 | Rotem et al. |
| 2011/0138388 | A1 | 6/2011 | Wells et al. |
| 2011/0145617 | A1 | 6/2011 | Thomson et al. |
| 2011/0154081 | A1 | 6/2011 | Allarey |
| 2011/0154348 | A1 | 6/2011 | Elnozahy et al. |
| 2011/0161627 | A1 | 6/2011 | Song et al. |
| 2011/0173477 | A1 | 7/2011 | Asaba |
| 2011/0238974 | A1 | 9/2011 | Wells et al. |
| 2012/0110352 | A1 | 5/2012 | Branover et al. |
| 2012/0159496 | A1* | 6/2012 | Dighe et al. ................... 718/102 |
| 2012/0166838 | A1 | 6/2012 | Nasrullah et al. |
| 2012/0169746 | A1 | 7/2012 | Samson |
| 2012/0221873 | A1* | 8/2012 | Wells et al. ................... 713/322 |
| 2013/0007413 | A1 | 1/2013 | Thomson et al. |
| 2013/0015904 | A1 | 1/2013 | Priel et al. |
| 2013/0097443 | A1 | 4/2013 | Li et al. |
| 2014/0002467 | A1 | 1/2014 | Linda |
| 2014/0006838 | A1 | 1/2014 | Linda |
| 2014/0085501 | A1 | 3/2014 | Tran |
| 2014/0089699 | A1 | 3/2014 | O'Connor et al. |
| 2014/0092106 | A1 | 4/2014 | Hurd et al. |
| 2014/0095906 | A1 | 4/2014 | Hurd |
| 2014/0095912 | A1 | 4/2014 | Hurd et al. |
| 2014/0245034 | A1 | 8/2014 | Rotem et al. |
| 2015/0179146 | A1 | 6/2015 | Hurd |

OTHER PUBLICATIONS

Notice of Allowance received for U.S. Appl. No. 13/077,618, mailed on May 30, 2013, 8 pages.
Non-Final Office Action received for U.S. Appl. No. 13/340,129, mailed on Jun. 5, 2014, 15 pages.
Non-Final Office Action received for U.S. Appl. No. 13/340,129, mailed on Dec. 13, 2013, 11 pages.
Non-Final Office Action received for U.S. Appl. No. 13/539,411, mailed on Jul. 2, 2014, 21 pages.
Final Office Action received for U.S. Appl. No. 13/539,414, mailed on Nov. 10, 2014, 12 pages.
Non-Final Office Action received for U.S. Appl. No. 13/539,414, mailed on Jul. 16, 2014, 11 pages.
Non-Final Office Action received for U.S. Appl. No. 13/631,913, mailed on Nov. 7, 2014, 15 pages.
Non-Final Office Action received for U.S. Appl. No. 13/631,930, mailed on Dec. 4, 2014, 14 pages.
International Preliminary Report on Patentability and Written Opinion received for PCT Patent Application No. PCT/US2011/068120, mailed on Jul. 10, 2014, 6 pages.
International Search Report and Written Opinion received for PCT Patent Application No. PCT/US2011/068120, mailed on Sep. 21, 2012, 9 pages.
International Preliminary Report on Patentability and Written Opinion received for PCT Patent Application No. PCT/US2012/071653, mailed on Jul. 10, 2014, 7 pages.
International Search Report and Written Opinion received for PCT Patent Application No. PCT/US2012/071653, mailed on Apr. 29, 2013, 10 pages.
Notice of Allowance received for U.S. Appl. No. 13/340,129, mailed on Nov. 21, 2014, 11 pages.
Notice of Allowance received for U.S. Appl. No. 13/631,921, mailed on Jun. 22, 2015, 8 pages.
Non-Final Office Action received for U.S. Appl. No. 13/631,921, mailed on Mar. 6, 2015, 23 pages.

* cited by examiner

CURRENT CHANGE MITIGATION POLICY FOR LIMITING VOLTAGE DROOP IN GRAPHICS LOGIC

FIELD

The present disclosure generally relates to the field of electronics. More particularly, an embodiment relates to a current change mitigation policy for limiting voltage droop in graphics logic.

BACKGROUND

To control power consumption, some processors are capable of operating at several different frequencies. For example, if a system is to reduce its power consumption (e.g., during idle times), a processor may be operated at a lower frequency. Alternatively, to improve performance (e.g., during complex computations), the processor may be operated at a higher frequency. Some processors may be used to perform graphics computations (also referred to as graphics processors). Graphics processors may however have a more complex design and may require performance of various additional operations whenever there is a change in their operating frequency. Hence, changing the operating frequency of graphics circuitry may result in additional delay, increased power consumption, and/or performance reduction.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Some embodiments provide a current change (di/dt) mitigation techniques for limiting voltage droop in graphics logic. The graphics logic (also referred to herein as "GFX") may include a GPU (Graphics Processing Unit) or other types of logic that perform computation(s) relating to graphics task(s), such as operation(s) that manipulate an image, frame, scene, etc., e.g., as will be further discussed herein. While some embodiments are discussed with reference to graphics logic, embodiments are not limited to graphics related logic and may be also applied to other types of non-graphic (e.g., general purpose) logic also. Moreover, various embodiments may be performed for any type of computing device such as a desktop computer, a mobile computer (such as a smartphone, tablet, UMPC (Ultra-Mobile Personal Computer), laptop computer, Ultrabook™ computing device, smart watch, smart glasses, etc.), a work station, etc., which may be embodied on a SOC (System On Chip) platform in an embodiment.

In an embodiment, a current change mitigation technique for liming voltage droop is performed (e.g., after end of GFSE (Graphics Frequency Switching Event)) using programmable Cdyn clamping (or reduction) for graphics logic. As discussed herein, the term dynamic capacitance (Cdyn) generally refers to the amount of dynamic capacitance for an integrated circuit component or package. In another embodiment, a current change mitigation technique for liming voltage droop is performed (e.g., after end of GFSE) using sensed voltage feedback for graphics logic. In turn, a reduction in the voltage droop allows for reduced guard banding of voltage. This also translates into improved overall power performance.

Figure 1:
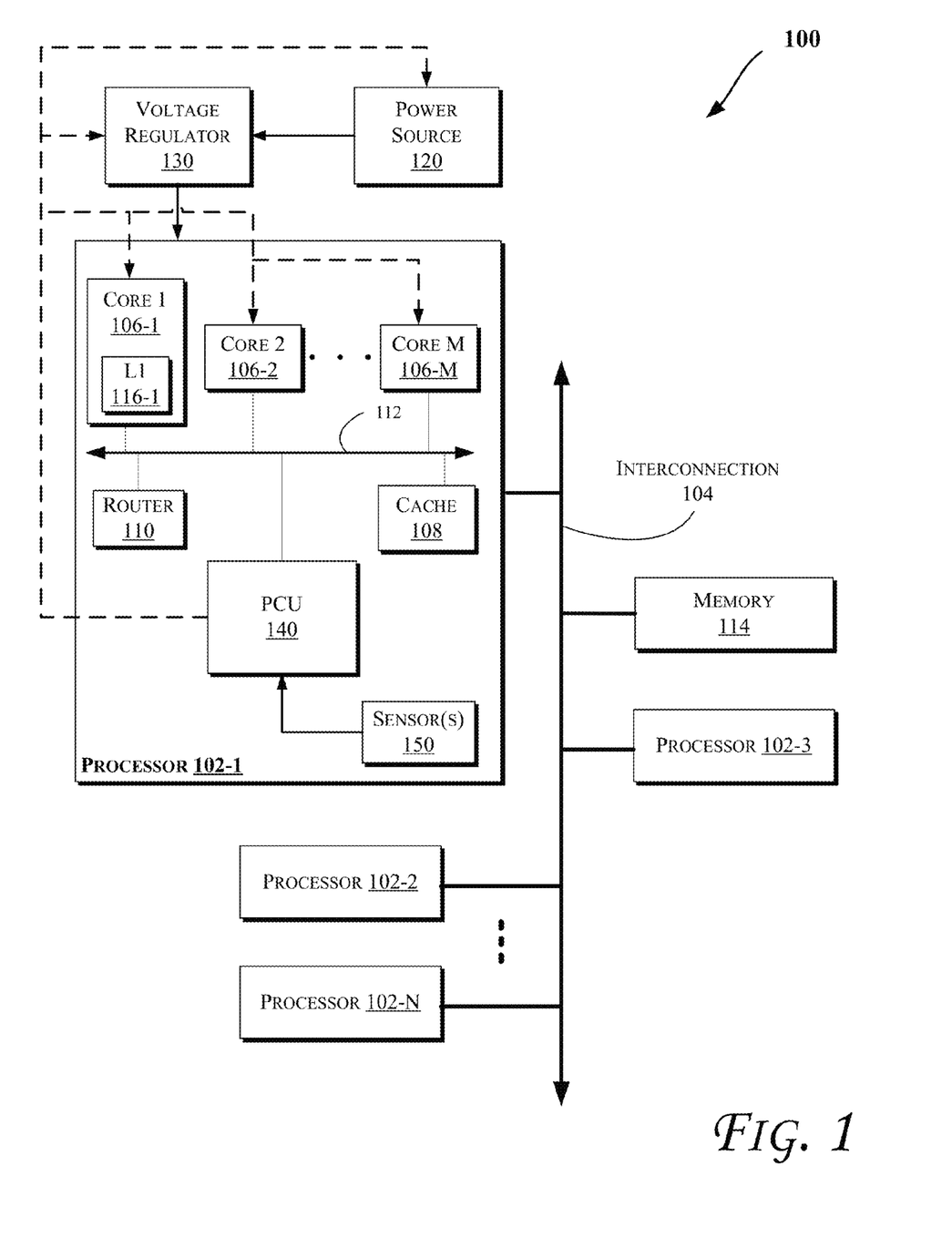
FIGS. 1 and 7-9 illustrate block diagrams of embodiments of computing systems, which may be utilized to implement various embodiments discussed herein.

Some embodiments may be applied in computing systems that include one or more processors (e.g., with one or more processor cores), such as those discussed with reference to FIGS. 1-9, including for example mobile computing devices such as a smartphone, tablet, UMPC (Ultra-Mobile Personal Computer), laptop computer, Ultrabook™ computing device, smart watch, smart glasses, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may be general-purpose CPUs and/or GPUs in various embodiments. The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 7-9), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a power source 120 (e.g., a direct current (DC) power source or an alternating current (AC) power source) to provide power to one or more components of the system 100. In some embodiments, the power source 120 may include one or more battery packs and/or power supplies. The power source 120 may be coupled to components of system 100 through a voltage regulator (VR) 130 (which may be a single or multiple phase VR). In an embodiment, the VR 130 may be a FIVR (Fully Integrated Voltage Regulator). Moreover, even though FIG. 1 illustrates one power source 120 and one voltage regulator 130, additional power sources and/or voltage regulators may be utilized. For example, each of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores). Power source may be capable of driving variable voltage or have different power drive configurations.

Additionally, while FIG. 1 illustrates the power source 120 and the voltage regulator 130 as separate components, the power source 120 and the voltage regulator 130 may be integrated and/or incorporated into other components of system 100. For example, all or portions of the VR 130 may be incorporated into the power source 120 and/or processor 102. Furthermore, as shown in FIG. 1, the power source 120 and/or the voltage regulator 130 may communicate with the power control logic 140 and report their power specification.

As shown in FIG. 1, the processor 102 may further include a Power Control Unit (PCU) logic 140 to control supply of power to one or more components of the processor 102 (e.g., cores 106). Logic 140 may have access to one or more storage devices discussed herein (such as cache 108, L1 cache 116, memory 114, register(s), or another memory in system 100) to store information relating to operations of the PCU logic 140 such as information communicated with various components of system 100 as discussed here.

As shown, the logic 140 may be coupled to the VR 130 and/or other components of system 100 such as the cores 106 and/or the power source 120. For example, the PCU logic 140 may be coupled to receive information (e.g., in the form of one or more bits or signals) to indicate status of one or more sensors 150 (where the sensor(s) 150 may be located proximate to components of system 100 (or other computing systems discussed herein such as those discussed with reference to other figures including FIGS. 7-9, for example), such as the cores 106, interconnections 104 or 112, etc., to sense variations in various factors affecting power/thermal behavior of the system, such as temperature, operating frequency, operating voltage, operating current, dynamic capacitance, power consumption, inter-core communication activity, etc.).

For example, the sensor(s) 150 may detect whether one or more subsystems are active (e.g., as discussed with reference to FIGS. 2-9). The logic 140 may in turn instruct the VR 130, power source 120, and/or individual components of system 100 (such as the cores 106) to modify their operations. For example, logic 140 may indicate to the VR 130 and/or power source 120 to adjust their output. In some embodiments, logic 140 may request the cores 106 to modify their operating frequency, power consumption, dynamic capacitance, operating current, etc. Also, even though components 140 and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, etc. Also, even though cores 106 are shown to be processor cores, these can be other computational element such as graphics cores, special function devices, etc.

Figure 2:
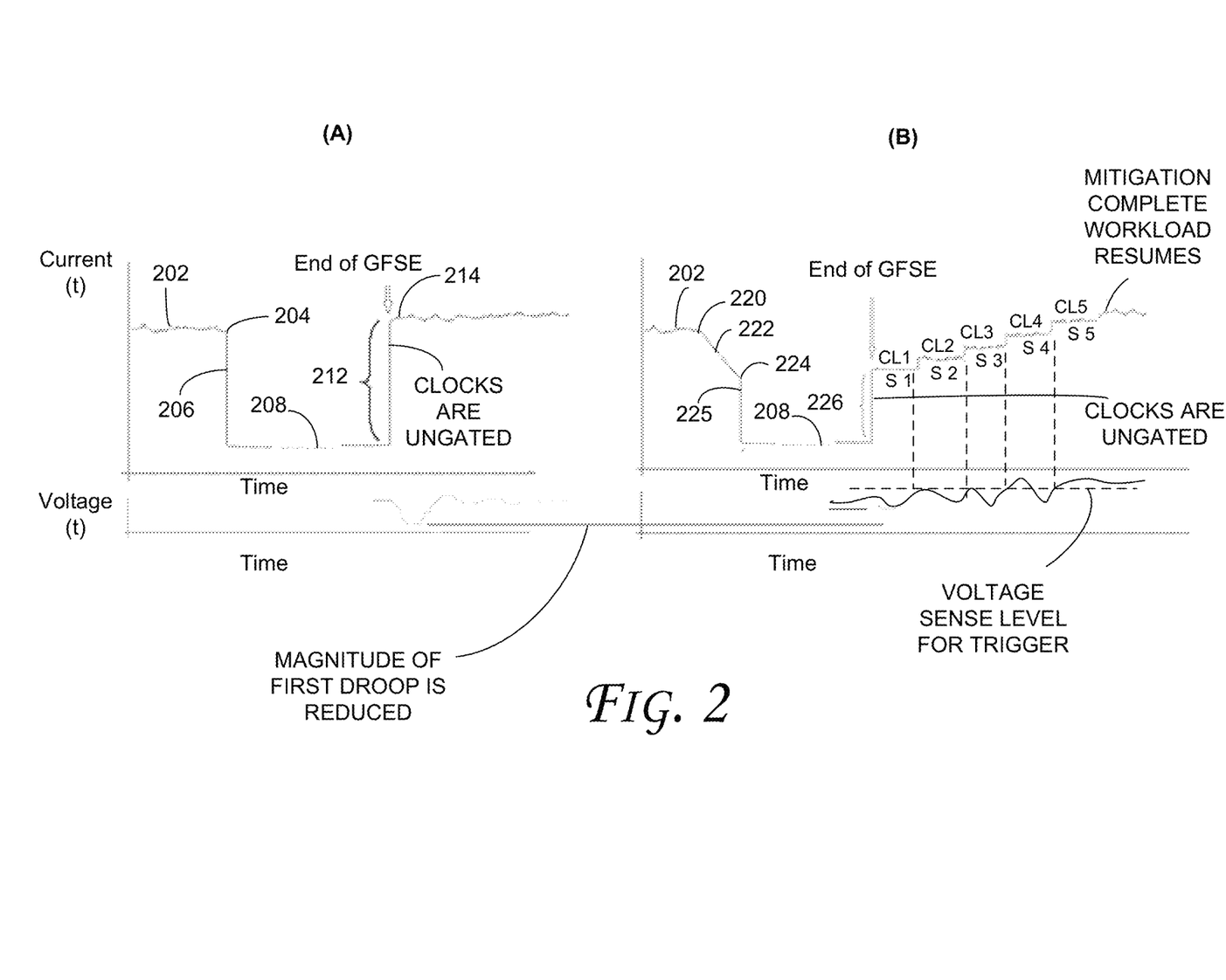
FIGS. 2, 5, and 6 illustrate sample graphs, according to some embodiments.

Generally, a GFSE operation needs to be performed whenever there is a change in the operating frequency of graphics logic. Following an end of GFSE (e.g., when clocks are ungated), there can be substantial droop in the voltage due to the abrupt change in current. FIG. 2 illustrates sample graphs that indicate sample current and sample voltage values over time, showing voltage droop without any current change mitigation policy following end of GFSE (A) and reduced voltage droop with current change mitigation policy following end of GFSE (B), according to some embodiments.

Figure 5:
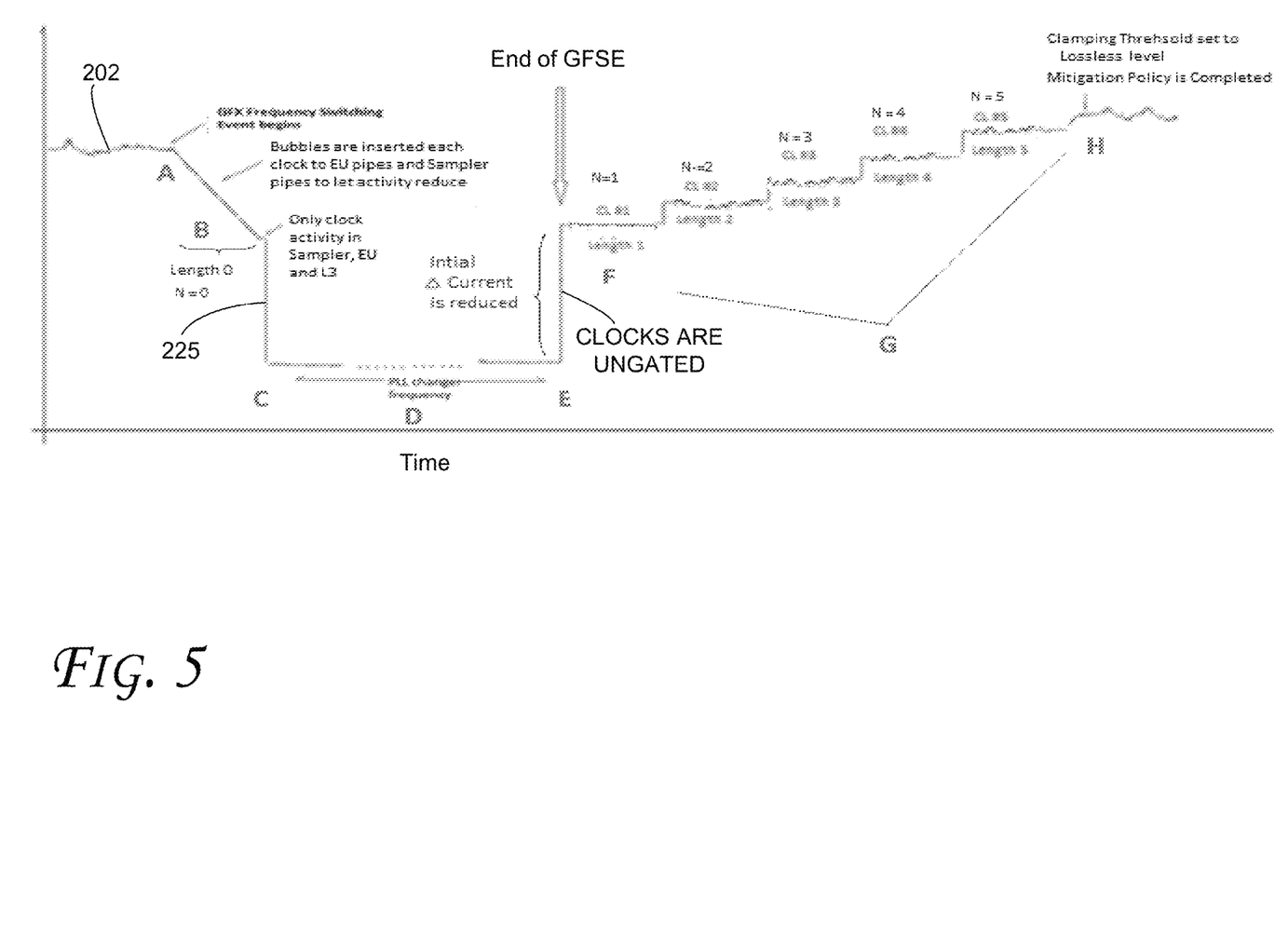

In some embodiments, to mitigate (or limit) this voltage droop, a programmable Cdyn clamping technique (e.g., with feedback control) is used, which controls the "dCdyn" of the dynamic component of the current and controls the "dt". This solution allows the ramp up of the current to be controlled in N steps (illustrated as S 1, S 2, etc. in FIG. 2). Each Step is defined by a length (L) and a maximum Cdyn level (or "Cdynmax"). As discussed herein, "CT" refers to or Clamping Threshold. Furthermore, in one embodiment, the length of each step is determined by feedback from one or more bump-level voltage sense points as further discussed below and shown in FIGS. 2(B) and/or 5.

As discussed herein, an "EU" or "Execution Unit" generally refers to a computational unit that is included in graphics logic. Also, more than one EU may be provided in each graphics logic, GPU, etc. Each EU may in turn include a plurality of (e.g., four) processing elements (such as ALUs (Arithmetic Logic Units), which may perform the role of shader processor(s)). Also, a sampler (also known as "3D Texture Sampler" sometimes) generally refers to logic for performing texture filtering (or smoothing) to determine the texture color for a texture-mapped-pixel using the colors of nearby texls (pixels of the texture). Moreover, the texturing process allows a texture to be applied at many different shapes, sizes, and angles, while minimizing blurriness, shimmering and blocking.

By contrast, some other change mitigation solutions may include allowing EU's to drain and stalling of the Samplers, which may result in additional delay, increased power consumption, and/or performance reduction.

Figure 3:
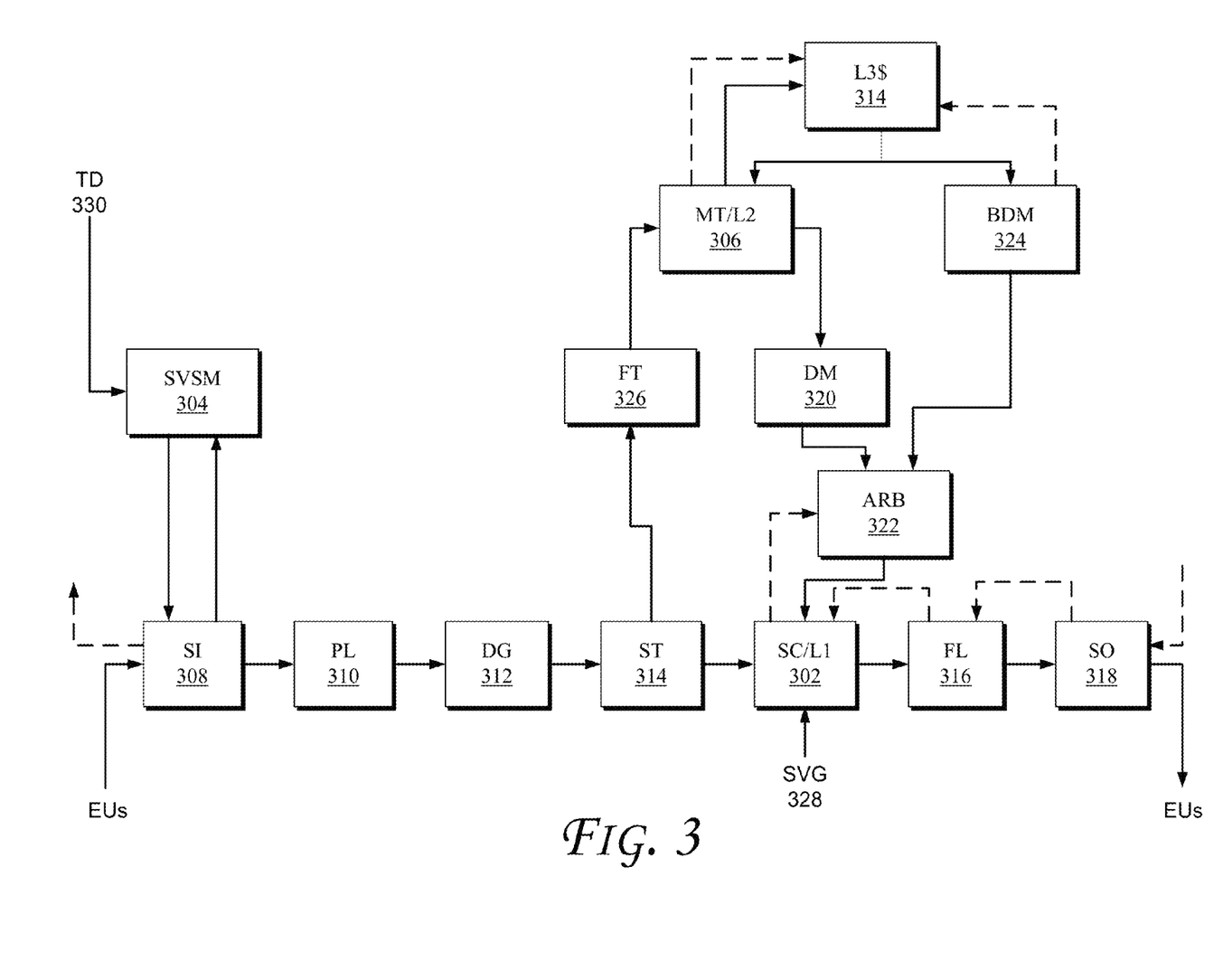
FIG. 3 illustrates a block diagram of components of a graphics logic or processor core in a GPU, according to an embodiment.
Figure 4:
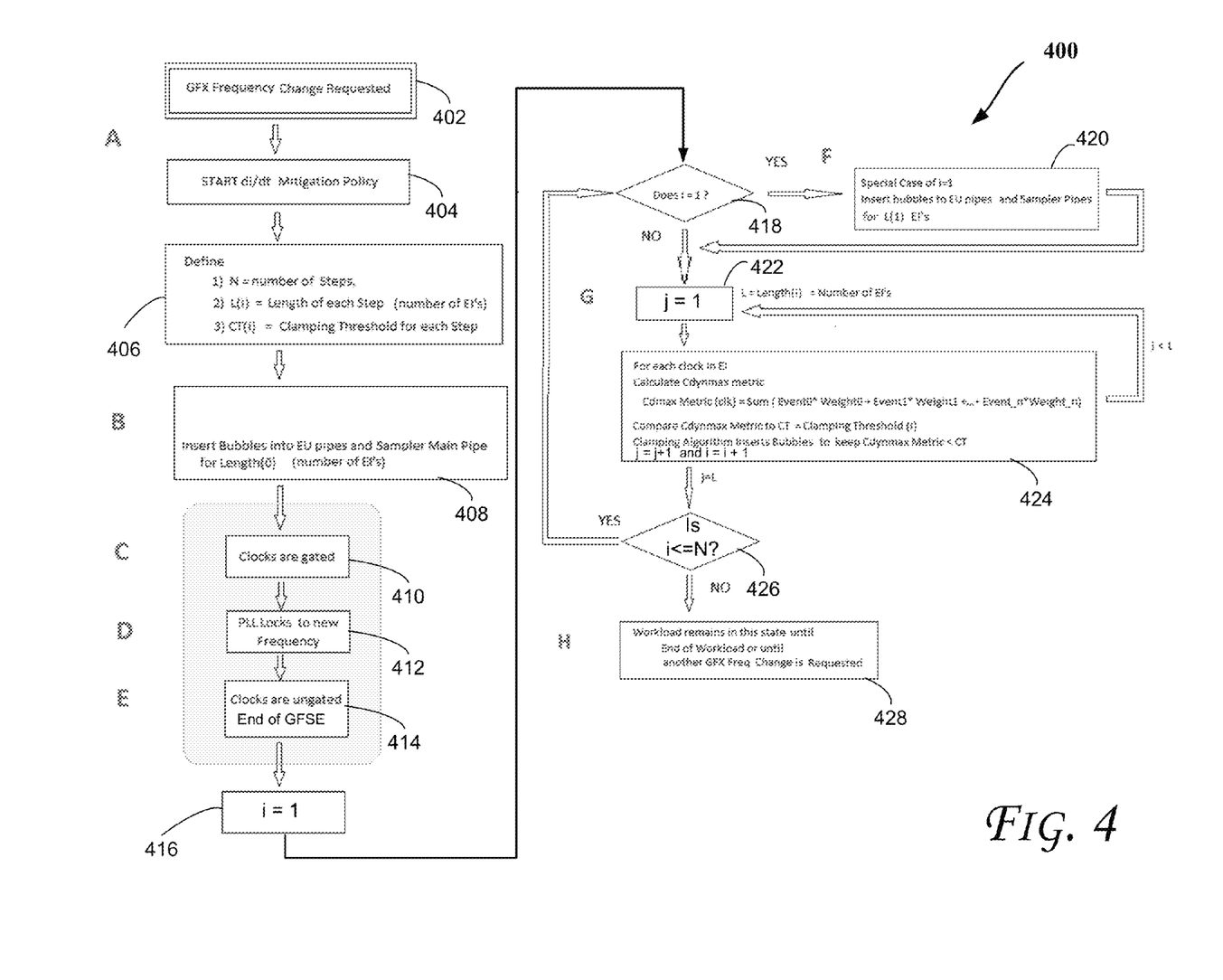
FIG. 4 illustrates a flow diagram of a method to mitigate current change for limiting voltage droop in graphics logic, according to some embodiments.

Referring to FIG. 2, 202 refers to a time period when the Graphics logic workload is running normally (e.g., sampler logic/pipeline(s), EUs, and L3$ (Third Level cache), such as those discussed further with reference to FIG. 3) are not idle). 204 refers to the point in time when the graphics frequency switch event begins. 206 refers to the time when most clocks are disabled/gated. 208 refers to the time period when PLL(s) (Phase Locked Loop(s)) change frequency. 212 refers to the time when clocks are ungated right before end of GFSE. 214 refers to the time when workload resumes running. 220 refers to the point in time when graphics logic frequency switch event starts. 222 refers to the point in time when bubbles are inserted in EUs and sampler in accordance with an embodiment, as will be further discussed with reference to FIG. 4 for example. As discussed herein, a "bubble" generally is used to indicate that a transaction is prevented from occurring in that particular clock cycle. For example, in the EU, when a bubble is inserted (which could include a packet or other indicia), the bubble prevents instructions from be issued to the computation logic (such as floating point unit(s)). In an embodiment, one or more bubbles are inserted in one or more EU pipeline(s) and/or in specified interface(s) within the Sampler pipeline(s) to at least temporarily quiet the graphics logic and/or in the EU pipe(s). 224 refers to a point in time when dynamic activity is reduced. 226 refers to when initial delta in current is reduced (e.g., clocks are ungated)

FIG. 3 illustrates a block diagram of components of a graphics logic or processor core in a GPU, according to an embodiment. The direction of arrows in FIG. 3 illustrate sample direction of data flow in some embodiments. Also, in FIG. 3, SC 302 refers to a Slice Common logic, SVSM 304 refers to state variable sampler logic that receives dispatched threads and forwards them to other components of the graphics logic, MT 306 refers to second level texture cache, S1 308 refers to sampler input logic, PL 310 refers to projection and LOD (Level of Detail) logic, DG 312 refers to dependent address generator logic, ST 314 refers to sampler tag logic, L1 302 refers to first level cache, FL 316 refers to filter logic, SO 318 refers to sampler output logic, L2 306 refers to second level cache, DM 320 refers to de-compressor logic, ARB 322 refers to arbitrator logic (e.g., to arbitrate between outputting a value corresponding to the output of DM logic 320 or BDM 324 which refers to bypass DM logic), FT 326 refers to fetch logic, SVG 328 refers to state variable logic, and TD 330 refers to thread dispatch logic. In an embodiment, a SVSM MT adapter is present (not shown), e.g., to couple MT 306 and SVSM 304.

FIG. 4 illustrates a flow diagram of a method 400 to mitigate current change for limiting voltage droop in graphics logic, according to some embodiments. One or more components discussed herein (e.g., with reference to FIGS. 1-3 and 5-9) may be used to perform one or more operations discussed with reference to FIG. 4.

FIG. 5 illustrates a sample graph that indicates sample current and sample voltage values over time, showing reduced voltage droop with current change mitigation policy following end of GFSE, according to an embodiment. FIG. 5 includes markers A to H that correspond to FIG. 4 operations.

Referring to FIGS. 1-5, one or more of the following items may be used to provide a programmable Cdyn clamping operation, in various embodiments:

(1) A "Cdynmax Metric" which is a sum of products and reflects an approximate upper bound of activity in graphics logic architecture (where "Cdynmax" refers to the maximum amount of dynamic capacitance for an integrated circuit component or package). Each product is a Cdynmax weight multiplied by an event count (where event count takes a value of either 0 or 1 in any given clock cycle in an embodiment). There is a dedicated Event and Cdynmax weight for each major subsystem in the Graphics architecture (such as the components discussed with reference to FIG. 3). The "Cdynmax Metric" is evaluated every clock cycle within an Evaluation Interval in an embodiment.

(2) A programmable "Evaluation Interval" or "EI" which defines a window of time over which the Cdynmax metric is monitored and controlled.

(3) A programmable Clamping Threshold or "CT" which specifies the upper allowable limit of the Cdynmax Metric.

(4) A feedback mechanism consisting of a Cdyn clamping algorithm which controls bubble insertion rate into the EU pipes and the Sampler pipeline.

(5) Control logic to sequence the ramp down of activity before clocks are gated for a graphics logic frequency switching event across a specified number of EI's.

(6) Control logic to sequence ramp up of activity following end of GFSE. The ramp up sequence is specified in N steps. Each step has a specified number of EI's and a specified clamping threshold level (e.g., CL1, CL2, etc.).

(7) The number of steps, number of EIs per step, and/or clamping threshold for each step can be unique for each frequency step and/or unique for workload category (e.g., 3D vs. GPGPU vs. Media).

Referring to FIGS. 1-5, one or more of the following items may be inserted between items (6) and (7) above to provide a programmable Cdyn clamping operation with sensed voltage feedback, in various embodiments:

(6a) Voltage sense point(s) on the bump(s): the length of each step is based upon feedback from a voltage sense point. A trigger is generated when the voltage has recovered a programmable amount. The trigger denotes the end of the step.

(6b) The trigger can be designated to occur after either first or second voltage droops.

Referring to FIGS. 1-5, at an operation 402, request for frequency change to graphics logic is received. At an operation 404, current change mitigation operation(s) are started. At an operation 406, N, L(i), and CT(i) are defined. At an operation 408, bubbles are inserted into EU pipeline(s) and sampler (e.g., main) pipeline for L(0). While N is indicated to be set at operation 406, 0 is used for N of the first step and the first step is performed before clock(s) are gated. At operations 410, 412, and 414, the clock(s) are gated, PLL(s) are locked to new frequency, and clock(s) are ungated (e.g., at end of GFSE), respectively.

At an operation 416, "i" is initialized, e.g., set to 1 (which will then cycle through to N). If "i" is equal to 1 at operation 418, bubbles are inserted to EU pipeline(s) and Samper pipeline(s) for L(1) EI's at operation 420. Otherwise, if i is not equal to 1 at 418, "j" is initialized, e.g., to 1 (which will then cycle through to L) at an operation 422. At operation 424, for each clock in EI, Cdynmax metric is determined (as shown and discussed above), the determined Cdynmax metric is compared to the CT(i), one or more bubbles are inserted to keep Cdynmax metric below CT(i), and j and i are incremented. As long as j is below L, operation 424 is repeated. Once j reached L, an operation 426 determines whether i has reached N. If it has not, method 400 returns to operation 418; otherwise, at an operation 428, the workload remains in its present state until end of the workload is reached or until another graphics logic frequency change is requested.

Referring to FIG. 4, one or more of the following modifications may be made to operations 420, 424, and 426 to provide a programmable Cdyn clamping operation with sensed voltage feedback, in various embodiments:

(a) at operation 420, bubble insertion may be performed until the voltage sense trigger occurs;

(b) operation 424 is repeated as long as the voltage sense trigger has not occurred; and/or (c) operation 426 is performed once the voltage sense trigger has occurred.

Figure 6:
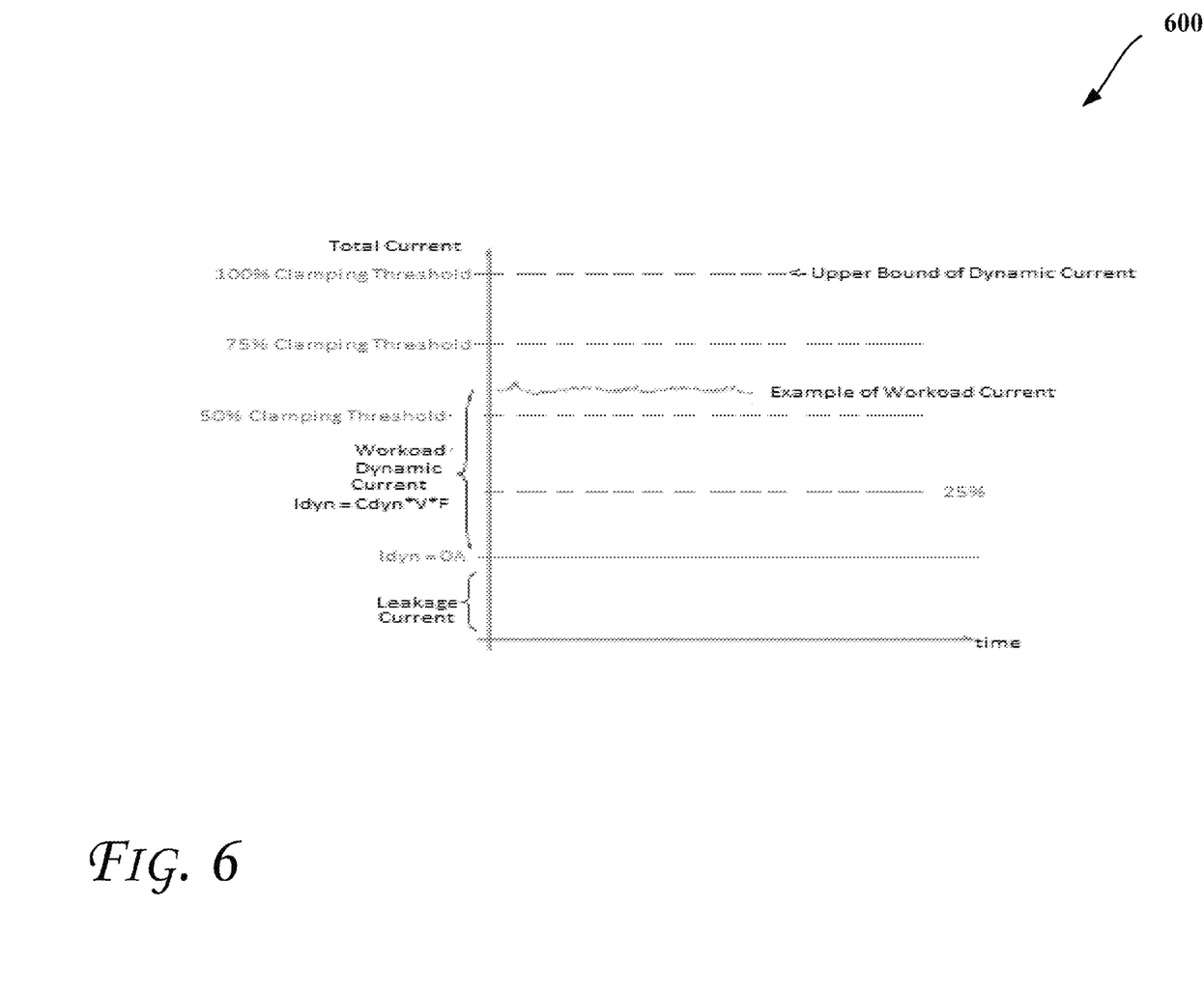

FIG. 6 illustrates a sample graph 600 of total current vs. time, according to an embodiment. Various clamping thresholds percentages are shown in FIG. 6. As shown, there is some leakage current below the dynamic current (Idyn) for the integrated circuit or package. Idyn may be computed by multiplying the current voltage (V) and frequency (F) by Cdyn.

More specifically, graph 600 shows some sample relative levels of Cdynmax clamping when a workload is running at about 60%.

In some implementations, using a sensed voltage to determine step length would involve less logic to implement and/or less pre-programmed values (e.g., with different number of steps and different step lengths depending on voltage and frequency operating points) than applying the Cdyn clamping technique discussed above. Also, using sensed voltage feedback allows the di/dt mitigation policy to be more adaptive to workload characteristics as well as to the voltage and frequency operating points.

Furthermore, other solutions may not allow for "programmable" controlling of both the delta time and delta Cdyn in step-wise fashion. Some embodiments support different combinations of N steps, length of each step, and/or clamping threshold of each step which can be uniquely assigned to each frequency step. For example, 500 MHz could have a different solution than 1 GHz.

Additionally, some embodiments support different combinations of N steps, length of each step and/or clamping threshold of each step which can be uniquely chosen for each workload type. For example, a media kernel (e.g., processing 2D workload, etc.) may not need as much mitigation compared to a 3D workload because media would have a relatively lower activity level.

An embodiment allows the first droop from the ungating of clocks to occur while the workload is "frozen" by allowing bubbles to be inserted into Sampler pipelines and EU pipelines until first droop has completed.

Moreover, other solutions may not allow for "programmable" controlling of both the delta time and delta Cdyn in stepwise fashion, when the number of steps is programmable and the length of each step is programmable (e.g., providing a fixed number of Evaluation Intervals).

One embodiment allows the length of each step to be based upon feedback of a sensed voltage. In this manner, the next step (and next clamping threshold) can be applied when the voltage has suitably recovered from the droop(s) generated by the change in current (dCdyn*V*F) from the previous step. This allows for more optimal solution for the range of workload characteristics and range of Voltage*Frequency products which exist for a given die.

Moreover, the scenes, images, or frames discussed herein (e.g., which may be processed by the graphics logic in various embodiments) may be captured by an image capture device (such as a digital camera (that may be embedded in another device such as a smart phone, a tablet, a laptop, a stand-alone camera, etc.) or an analog device whose captured images are subsequently converted to digital form). Moreover, the image capture device may be capable of capturing multiple frames in an embodiment. Further, one or more of the frames in the scene are designed/generated on a computer in some embodiments. Also, one or more of the frames of the scene may be presented via a display (such as the display discussed with reference to FIGS. 7 and/or 8, including for example a flat panel display device, etc.).

Figure 7:
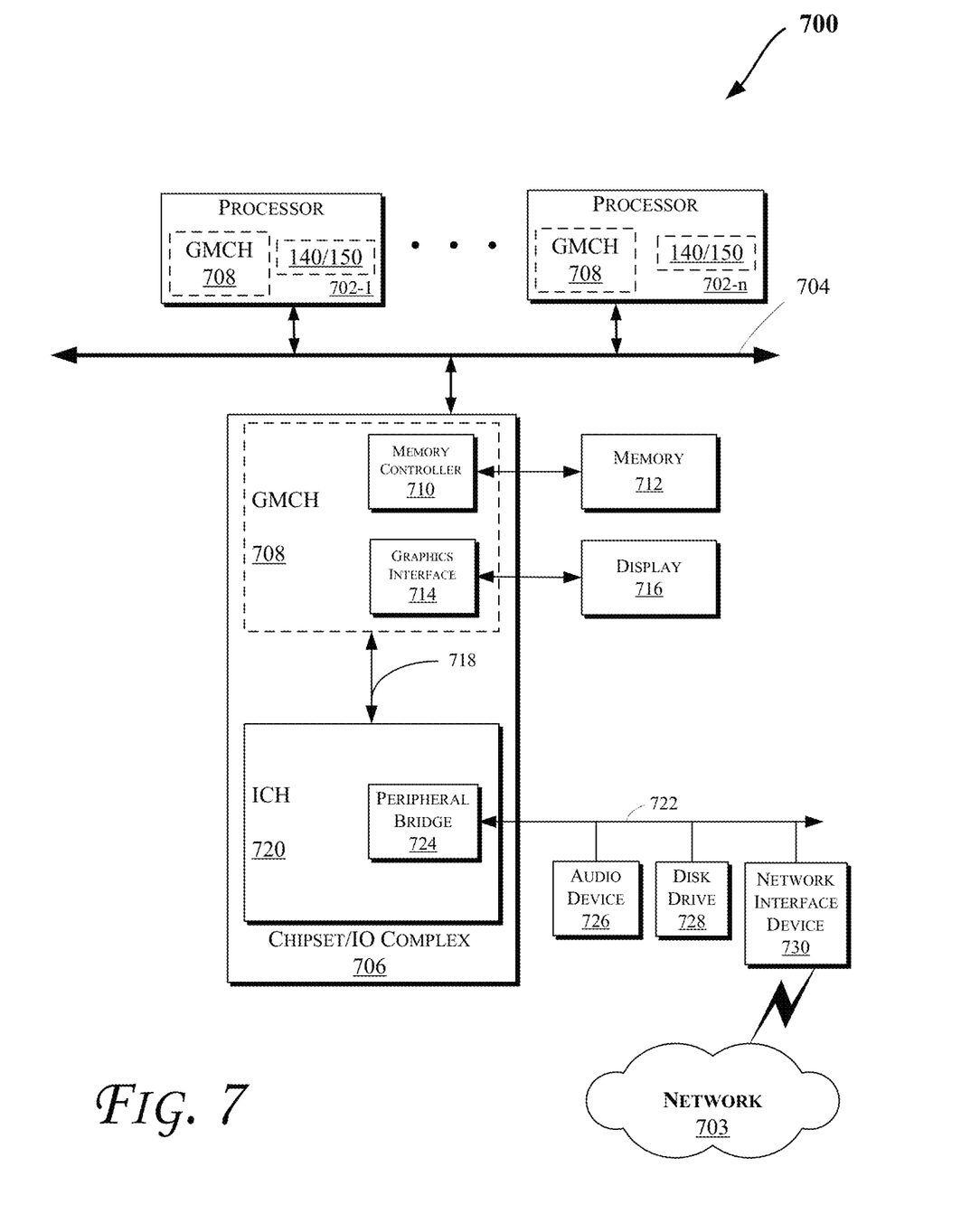
Figure 8:
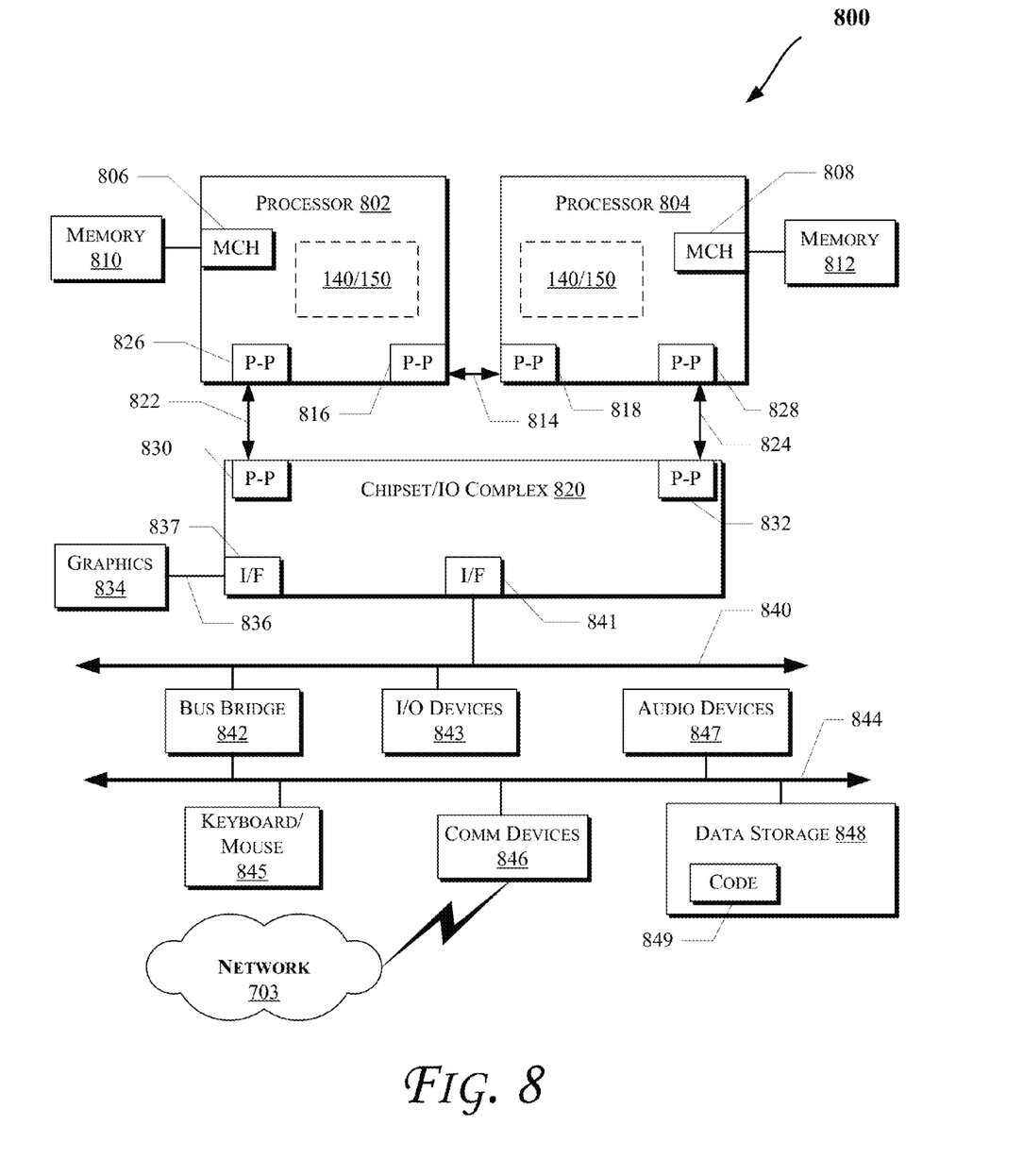

FIG. 7 illustrates a block diagram of a computing system 700 in accordance with an embodiment. The computing system 700 may include one or more central processing unit(s) (CPUs) 702 or processors that communicate via an interconnection network (or bus) 704. The processors 702 may include a general purpose processor, a network processor (that processes data communicated over a computer network 703), or other types of a processor (including a reduced instruction set computer (RISC) processor or a complex instruction set computer (CISC)).

Moreover, the processors 702 may have a single or multiple core design. The processors 702 with a multiple core design may integrate different types of processor cores on the same integrated circuit (IC) die. Also, the processors 702 with a multiple core design may be implemented as symmetrical or asymmetrical multiprocessors. In an embodiment, one or more of the processors 702 may be the same or similar to the processors 102 of FIG. 1. For example, one or more components of system 700 may include one or more of logic 140 and/or sensor(s) 150 discussed with reference to FIGS. 1-6. Also, the operations discussed with reference to FIGS. 1-6 may be performed by one or more components of the system 700.

A chipset 706 may also communicate with the interconnection network 704. The chipset 706 may include a graphics memory control hub (GMCH) 708, which may be located in various components of system 700 (such as those shown in FIG. 7). The GMCH 708 may include a memory controller 710 that communicates with a memory 712 (which may be the same or similar to the memory 114 of FIG. 1). The memory 712 may store data, including sequences of instructions, that may be executed by the CPU 702, or any other device included in the computing system 700. In one embodiment, the memory 712 may include one or more volatile storage (or memory) devices such as random access memory (RAM), dynamic RAM (DRAM), synchronous DRAM (SDRAM), static RAM (SRAM), or other types of storage devices. Non-volatile memory may also be utilized such as a hard disk. Additional devices may communicate via the interconnection network 704, such as multiple CPUs and/or multiple system memories.

The GMCH 708 may also include a graphics interface 714 that communicates with a display device 716. In one embodiment, the graphics interface 714 may communicate with the display device 716 via an accelerated graphics port (AGP) or Peripheral Component Interconnect (PCI) (or PCI express (PCIe) interface). In an embodiment, the display 716 (such as a flat panel display) may communicate with the graphics interface 714 through, for example, a signal converter that translates a digital representation of an image stored in a storage device such as video memory or system memory into display signals that are interpreted and displayed by the display 716. The display signals produced by the display device may pass through various control devices before being interpreted by and subsequently displayed on the display 716.

A hub interface 718 may allow the GMCH 708 and an input/output control hub (ICH) 720 to communicate. The ICH 720 may provide an interface to I/O device(s) that communicate with the computing system 700. The ICH 720 may communicate with a bus 722 through a peripheral bridge (or controller) 724, such as a peripheral component interconnect (PCI) bridge, a universal serial bus (USB) controller, or other types of peripheral bridges or controllers. The bridge 724 may provide a data path between the CPU 702 and peripheral devices. Other types of topologies may be utilized. Also, multiple buses may communicate with the ICH 720, e.g., through multiple bridges or controllers. Moreover, other peripherals in communication with the ICH 720 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 722 may communicate with an audio device 726, one or more disk drive(s) 728, and a network interface device 730 (which is in communication with the computer network 703). Other devices may communicate via the bus 722. Also, various components (such as the network interface device 730) may communicate with the GMCH 708 in some embodiments. In addition, the processor 702 and the GMCH 708 may be combined to form a single chip. Furthermore, a graphics accelerator may be included within the GMCH 708 in other embodiments.

Furthermore, the computing system 700 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 728), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

FIG. 8 illustrates a computing system 800 that is arranged in a point-to-point (PtP) configuration, according to an embodiment. In particular, FIG. 8 shows a system where processors, memory, and input/output devices are interconnected by a number of point-to-point interfaces. The operations discussed with reference to FIGS. 1-7 may be performed by one or more components of the system 800.

As illustrated in FIG. 8, the system 800 may include several processors, of which only two, processors 802 and 804 are shown for clarity. The processors 802 and 804 may each include a local memory controller hub (MCH) 806 and 808 to enable communication with memories 810 and 812. The memories 810 and/or 812 may store various data such as those discussed with reference to the memory 712 of FIG. 7.

In an embodiment, the processors 802 and 804 may be one of the processors 702 discussed with reference to FIG. 7. The processors 802 and 804 may exchange data via a point-to-point (PtP) interface 814 using PtP interface circuits 816 and 818, respectively. Also, the processors 802 and 804 may each exchange data with a chipset 820 via individual PtP interfaces 822 and 824 using point-to-point interface circuits 826, 828, 830, and 832. The chipset 820 may further exchange data with a graphics circuit 834 via a graphics interface 836, e.g., using a PtP interface circuit 837.

At least one embodiment may be provided within the processors 802 and 804. For example, one or more components of system 800 may include one or more of logic 140 and/or sensor(s) 150 of FIGS. 1-7, including located within the processors 802 and 804. Other embodiments, however, may exist in other circuits, logic units, or devices within the system 800 of FIG. 8. Furthermore, other embodiments may be distributed throughout several circuits, logic units, or devices illustrated in FIG. 8.

The chipset 820 may communicate with a bus 840 using a PtP interface circuit 841. The bus 840 may communicate with one or more devices, such as a bus bridge 842 and I/O devices 843. Via a bus 844, the bus bridge 842 may communicate with other devices such as a keyboard/mouse 845, communication devices 846 (such as modems, network interface devices, or other communication devices that may communicate with the computer network 703), audio I/O device 847, and/or a data storage device 848. The data storage device 848 may store code 849 that may be executed by the processors 802 and/or 804.

Figure 9:
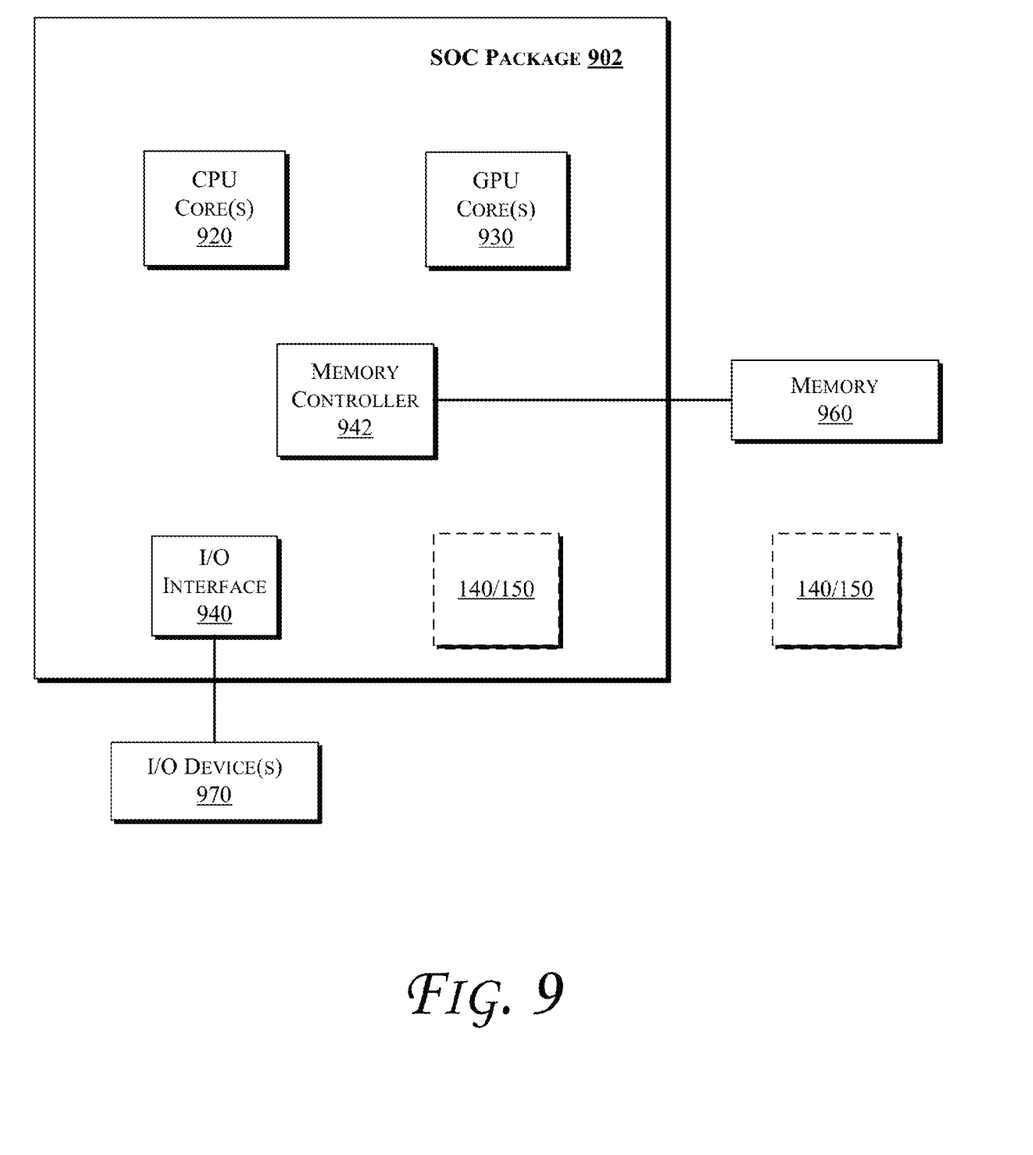

In some embodiments, one or more of the components discussed herein can be embodied as a System On Chip (SOC) device. FIG. 9 illustrates a block diagram of an SOC package in accordance with an embodiment. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 920 may include one or more other components, e.g., as discussed with reference to the other figures herein. In one embodiment, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an embodiment, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like. Furthermore, SOC package 902 may include/integrate the logic 140 and/or sensor(s) 150 in an embodiment. Alternatively, the logic 140 and/or sensor(s) 150 may be provided outside of the SOC package 902 (i.e., as a discrete logic).

The following examples pertain to further embodiments. Example 1 includes an apparatus comprising: logic, the logic at least partially comprising hardware logic, to insert one or more bubbles in one or more Execution Unit (EU) logic pipelines or one or more sampler logic pipelines of a processor to at least temporarily reduce execution of operations in one or more subsystems of the processor based at least partially on a comparison of a first value and one or more clamping threshold values, wherein the first value is to be determined based at least partially on a summation of products of one or more event counts and dynamic capacitance weights for one or more subsystems of the processor. Example 2 includes the apparatus of example 1, wherein logic to insert the one or more bubbles is to insert the one or more bubbles to keep the first value below the one or more clamping threshold values. Example 3 includes the apparatus of example 1, wherein each of the one or more clamping thresholds values are to correspond to one of one or more steps and wherein the length of each of the one or more steps is to be determined based at least partially on feedback from a voltage sense point. Example 4 includes the apparatus of example 1, wherein logic to insert the one or more bubbles is to insert the one or more bubbles until an occurrence of a voltage sense trigger. Example 5 includes the apparatus of example 1, wherein logic to insert the one or more bubbles is to insert the one or more bubbles in response to a modification request to an operating frequency of the processor. Example 6 includes the apparatus of example 1, wherein logic to insert the one or more bubbles is to insert the one or more bubbles after one or more clocks are ungated following a modification to an operating frequency of the processor. Example 7 includes the apparatus of example 1, wherein the one or more subsystems are to comprise one or more of: an execution unit, a sampler logic, and a third level cache. Example 8 includes the apparatus of example 1, further comprising one or more sensors to detect variations, corresponding to components of the processor, in one or more of: temperature, operating frequency, operating voltage, operating current, dynamic capacitance, power consumption, or inter-core communication activity. Example 9 includes the apparatus of example 1, wherein the processor is to comprise one or more processor cores to perform graphics or general-purpose computational operations. Example 10 includes the apparatus of example 1, wherein the one or more subsystems, a voltage regulator, the logic, or memory are on a single integrated circuit die.

Example 11 includes a method comprising: inserting one or more bubbles in one or more Execution Unit (EU) logic pipelines or one or more sampler logic pipelines of a processor to at least temporarily reduce execution of operations in one or more subsystems of the processor based at least partially on a comparison of a first value and one or more clamping threshold values, wherein the first value is determined based at least partially on a summation of products of one or more event counts and dynamic capacitance weights for one or more subsystems of the processor. Example 12 includes the method of example 11, further comprising inserting the one or more bubbles to keep the first value below the one or more clamping threshold values. Example 13 includes the method of example 11, wherein each of the one or more clamping thresholds values correspond to one of one or more steps and wherein the length of each of the one or more steps is determined based at least partially on feedback from a voltage sense point. Example 14 includes the method of example 11, further comprising ceasing insertion of the one or more bubbles in response to an occurrence of a voltage sense trigger. Example 15 includes the method of example 11, further comprising inserting the one or more bubbles in response to a modification request to an operating frequency of the processor. Example 16 includes the method of example 11, further comprising inserting the one or more bubbles after one or more clocks are ungated following a modification to an operating frequency of the processor. Example 17 includes the method of example 11, further comprising one or more sensors detecting variations, corresponding to components of the processor, in one or more of: temperature, operating frequency, operating voltage, operating current, dynamic capacitance, power consumption, or inter-core communication activity. Example 18 includes the method of example 11, further comprising the processor, having one or more processor cores, performing graphics or general-purpose computational operations.

Example 19 includes a computer-readable medium comprising one or more instructions that when executed on a processor configure the processor to perform one or more operations of any of examples 11 to 18.

Example 20 includes an apparatus comprising means for performing one or more operations of any of examples 11 to 18.

Example 21 includes a system comprising: a processor having one or more processor cores; memory to store data, corresponding to at least one frame of a scene, to be accessed by at least one of the one or more processor cores; a display device to present the at least one frame of the scene; the processor comprising: logic, the logic at least partially comprising hardware logic, to insert one or more bubbles in one or more Execution Unit (EU) logic pipelines or one or more sampler logic pipelines of the processor to at least temporarily reduce execution of operations in one or more subsystems of the processor based at least partially on a comparison of a first value and one or more clamping threshold values, wherein the first value is to be determined based at least partially on a summation of products of one or more event counts and dynamic capacitance weights for one or more subsystems of the processor. Example 22 includes the system of example 21, wherein logic to insert the one or more bubbles is to insert the one or more bubbles to keep the first value below the one or more clamping threshold values. Example 23 includes the system of example 21, wherein each of the one or more clamping thresholds values are to correspond to one of one or more steps and wherein the length of each of the one or more steps is to be determined based at least partially on feedback from a voltage sense point. Example 24 includes the system of example 21, wherein logic to insert the one or more bubbles is to cease insertion of the one or more bubbles in response to an occurrence of a voltage sense trigger. Example 25 includes the system of example 21, wherein logic to insert the one or more bubbles is to insert the one or more bubbles in response to a modification request to an operating frequency of the processor.

In various embodiments, the operations discussed herein, e.g., with reference to FIGS. 1-9, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-9.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    logic, the logic at least partially comprising hardware logic, to insert one or more bubbles in one or more Execution Unit (EU) logic pipelines or one or more sampler logic pipelines of a processor to at least temporarily reduce execution of operations in one or more subsystems of the processor based at least partially on a comparison of a first value and one or more clamping threshold values,
    wherein the first value is to be determined based at least partially on a summation of products of one or more event counts and dynamic capacitance weights for one or more subsystems of the processor, wherein each of the one or more clamping thresholds values are to correspond to one of one or more steps and wherein the length of each of the one or more steps is to be determined based at least partially on feedback from a voltage sense point.

2. The apparatus of claim 1, wherein logic to insert the one or more bubbles is to insert the one or more bubbles to keep the first value below the one or more clamping threshold values.

3. The apparatus of claim 1, wherein logic to insert the one or more bubbles is to cease insertion of the one or more bubbles in response to an occurrence of a voltage sense trigger.

4. The apparatus of claim 1, wherein logic to insert the one or more bubbles is to insert the one or more bubbles in response to a modification request to an operating frequency of the processor.

5. The apparatus of claim 1, wherein logic to insert the one or more bubbles is to insert the one or more bubbles after one or more clocks are ungated following a modification to an operating frequency of the processor.

6. The apparatus of claim 1, wherein the one or more subsystems are to comprise one or more of: an execution unit, a sampler logic, and a third level cache.

7. The apparatus of claim 1, further comprising one or more sensors to detect variations, corresponding to components of the processor, in one or more of: temperature, operating frequency, operating voltage, operating current, dynamic capacitance, power consumption, or inter-core communication activity.

8. The apparatus of claim 1, wherein the processor is to comprise one or more processor cores to perform graphics or general-purpose computational operations.

9. The apparatus of claim 1, wherein the one or more subsystems, a voltage regulator, the logic, or memory are on a single integrated circuit die.

10. A method comprising:
inserting one or more bubbles in one or more Execution Unit (EU) logic pipelines or one or more sampler logic pipelines of a processor to at least temporarily reduce execution of operations in one or more subsystems of the processor based at least partially on a comparison of a first value and one or more clamping threshold values,
wherein the first value is determined based at least partially on a summation of products of one or more event counts and dynamic capacitance weights for one or more subsystems of the processor, wherein each of the one or more clamping thresholds values correspond to one of one or more steps and wherein the length of each of the one or more steps is determined based at least partially on feedback from a voltage sense point.

11. The method of claim 10, further comprising inserting the one or more bubbles to keep the first value below the one or more clamping threshold values.

12. The method of claim 10, further comprising causing insertion of the one or more bubbles after one or more clocks are ungated following a modification to an operating frequency of the processor.

13. A non-transitory computer-readable medium comprising one or more instructions that when executed on a processor configure the processor to perform one or more operations to:
insert one or more bubbles in one or more Execution Unit (EU) logic pipelines or one or more sampler logic pipelines of a processor to at least temporarily reduce execution of operations in one or more subsystems of the processor based at least partially on a comparison of a first value and one or more clamping threshold values,
wherein the first value is determined based at least partially on a summation of products of one or more event counts and dynamic capacitance weights for one or more subsystems of the processor; and
cause insertion of the one or more bubbles after one or more clocks are ungated following a modification to an operating frequency of the processor.

14. The computer-readable medium of claim 13, further comprising one or more instructions that when executed on the processor configure the processor to perform one or more operations to cause insertion of the one or more bubbles to keep the first value below the one or more clamping threshold values.

15. The computer-readable medium of claim 13, further comprising one or more instructions that when executed on the processor configure the processor to perform one or more operations to cause ceasing of insertion of the one or more bubbles in response to an occurrence of a voltage sense trigger.

16. The computer-readable medium of claim 13, further comprising one or more instructions that when executed on the processor configure the processor to perform one or more operations to cause insertion of the one or more bubbles in response to a modification request to an operating frequency of the processor.

17. The computer-readable medium of claim 13, further comprising one or more instructions that when executed on the processor configure the processor to perform one or more operations to cause one or more sensors to detect variations, corresponding to components of the processor, in one or more of: temperature, operating frequency, operating voltage, operating current, dynamic capacitance, power consumption, or inter-core communication activity.

18. The computer-readable medium of claim 13, further comprising one or more instructions that when executed on the processor configure the processor to perform one or more operations to cause the processor, having one or more processor cores, to perform graphics or general-purpose computational operations.

19. A system comprising:
a processor having one or more processor cores;
memory to store data, corresponding to at least one frame of a scene, to be accessed by at least one of the one or more processor cores;
a display device to present the at least one frame of the scene;
the processor comprising:
logic, the logic at least partially comprising hardware logic, to insert one or more bubbles in one or more Execution Unit (EU) logic pipelines or one or more sampler logic pipelines of the processor to at least temporarily reduce execution of operations in one or more subsystems of the processor based at least partially on a comparison of a first value and one or more clamping threshold values,
wherein the first value is to be determined based at least partially on a summation of products of one or more event counts and dynamic capacitance weights for one or more subsystems of the processor, wherein each of the one or more clamping thresholds values are to correspond to one of one or more steps and wherein the length of each of the one or more steps is to be determined based at least partially on feedback from a voltage sense point.

20. The system of claim 19, wherein logic to insert the one or more bubbles is to insert the one or more bubbles to keep the first value below the one or more clamping threshold values.

21. The system of claim 19, wherein logic to insert the one or more bubbles is to cease insertion of the one or more bubbles in response to an occurrence of a voltage sense trigger.

22. The system of claim 19, wherein logic to insert the one or more bubbles is to insert the one or more bubbles in response to a modification request to an operating frequency of the processor.

23. A method comprising:
inserting one or more bubbles in one or more Execution Unit (EU) logic pipelines or one or more sampler logic pipelines of a processor to at least temporarily reduce execution of operations in one or more subsystems of the processor based at least partially on a comparison of a first value and one or more clamping threshold values,
wherein the first value is determined based at least partially on a summation of products of one or more event counts and dynamic capacitance weights for one or more subsystems of the processor; and
causing insertion of the one or more bubbles after one or more clocks are ungated following a modification to an operating frequency of the processor.

24. The method of claim 23, further comprising causing insertion of the one or more bubbles to keep the first value below the one or more clamping threshold values.

25. The method of claim 23, further comprising causing ceasing of insertion of the one or more bubbles in response to an occurrence of a voltage sense trigger.

26. The method of claim 23, further comprising causing insertion of the one or more bubbles in response to a modification request to an operating frequency of the processor.

* * * * *